United States Patent
Quach et al.

(10) Patent No.: US 10,030,523 B2
(45) Date of Patent: Jul. 24, 2018

(54) ARTICLE HAVING COOLING PASSAGE WITH UNDULATING PROFILE

(71) Applicant: United Technologies Corporation, Hartford, CT (US)

(72) Inventors: San Quach, East Hartford, CT (US); Tracy A. Propheter-Hinckley, Manchester, CT (US); Steven Bruce Gautschi, Naugatuck, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 315 days.

(21) Appl. No.: 14/622,000

(22) Filed: Feb. 13, 2015

(65) Prior Publication Data
US 2016/0356161 A1 Dec. 8, 2016

(51) Int. Cl.
  *F01D 5/18* (2006.01)
  *F01D 25/12* (2006.01)
  *F02C 7/18* (2006.01)
  *F01D 5/14* (2006.01)
  *F01D 11/00* (2006.01)

(52) U.S. Cl.
  CPC ............... *F01D 5/18* (2013.01); *F01D 5/143* (2013.01); *F01D 5/187* (2013.01); *F01D 11/006* (2013.01); *F01D 25/12* (2013.01); *F02C 7/18* (2013.01); *F05D 2240/81* (2013.01); *F05D 2250/184* (2013.01); *Y02T 50/676* (2013.01)

(58) Field of Classification Search
  CPC . F01D 5/18; F01D 5/187; F01D 25/12; F01D 11/001; F01D 11/006; F01D 11/24; F01D 5/08; F01D 5/046; F01D 5/081; F01D 5/085; F01D 5/087; F01D 5/141; F01D 4/143; F02C 7/18; F05D 2240/81; Y02T 50/676

USPC .............. 416/95, 96 R; 415/115, 175, 117
See application file for complete search history.

(56) References Cited

U.S. PATENT DOCUMENTS

| | | | | |
|---|---|---|---|---|
| 4,350,473 A | * | 9/1982 | Dakin | F01D 5/185 415/116 |
| 4,457,668 A | * | 7/1984 | Hallinger | F01D 5/26 416/190 |
| 4,712,979 A | * | 12/1987 | Finger | F01D 5/081 415/115 |
| 4,848,081 A | | 7/1989 | Kennedy | |

(Continued)

FOREIGN PATENT DOCUMENTS

EP 0550127 7/1993
EP 1205634 5/2002

OTHER PUBLICATIONS

European Search Report for European Patent Application No. 16155758 completed Jul. 5, 2016.

(Continued)

*Primary Examiner* — Kenneth Bomberg
*Assistant Examiner* — Brian Delrue
(74) *Attorney, Agent, or Firm* — Carlson, Gaskey & Olds, P.C.

(57) ABSTRACT

An article for gas turbine engine includes a body that has a gaspath side for exposure in a core gaspath of a gas turbine engine. The gaspath side has an undulating surface. A cooling passage is in the body. The cooling passage has a undulating profile that corresponds to the undulating surface.

24 Claims, 6 Drawing Sheets

(56) References Cited

U.S. PATENT DOCUMENTS

| | | | | |
|---|---|---|---|---|
| 5,281,097 A * | 1/1994 | Wilson | F01D 5/081 | 415/115 |
| 6,071,075 A * | 6/2000 | Tomita | F01D 5/187 | 416/97 A |
| 6,078,022 A * | 6/2000 | Dulaney | C21D 10/005 | 148/525 |
| 6,120,249 A * | 9/2000 | Hultgren | F01D 5/187 | 416/193 A |
| 6,190,130 B1 * | 2/2001 | Fukue | F01D 5/187 | 415/115 |
| 6,196,799 B1 * | 3/2001 | Fukue | F01D 5/186 | 416/97 R |
| 6,402,471 B1 * | 6/2002 | Demers | F01D 5/081 | 415/115 |
| 6,457,935 B1 * | 10/2002 | Antunes | F01D 11/008 | 415/115 |
| 6,478,540 B2 * | 11/2002 | Abuaf | F01D 5/187 | 416/1 |
| 6,830,427 B2 * | 12/2004 | Lafarge | F01D 5/288 | 415/115 |
| 6,945,749 B2 * | 9/2005 | De Cardenas | F01D 5/081 | 415/115 |
| 7,255,536 B2 * | 8/2007 | Cunha | F01D 5/18 | 416/193 A |
| 7,303,376 B2 * | 12/2007 | Liang | F01D 5/187 | 416/233 |
| 7,534,088 B1 * | 5/2009 | Alvanos | F01D 5/081 | 415/115 |
| 7,758,309 B2 * | 7/2010 | Bolms | F01D 5/081 | 416/193 A |
| 8,157,527 B2 * | 4/2012 | Piggush | F01D 5/187 | 416/97 R |
| 8,206,114 B2 * | 6/2012 | Spangler | F01D 5/187 | 416/193 A |
| 8,356,978 B2 * | 1/2013 | Beattie | F01D 5/18 | 415/115 |
| 8,573,925 B2 * | 11/2013 | Townes | F01D 5/225 | 415/115 |
| 8,647,067 B2 * | 2/2014 | Pandey | F01D 5/143 | 416/193 A |
| 8,684,664 B2 * | 4/2014 | Harris, Jr. | F01D 5/081 | 29/889.721 |
| 8,734,111 B2 * | 5/2014 | Lomas | F01D 5/187 | 416/193 A |
| 8,845,289 B2 * | 9/2014 | Walunj | F01D 5/186 | 416/193 A |
| 8,851,846 B2 * | 10/2014 | Ellis | F01D 5/081 | 416/193 A |
| 8,858,160 B2 * | 10/2014 | Walunj | F01D 5/186 | 415/115 |
| 8,961,137 B2 * | 2/2015 | Berche | F01D 5/082 | 416/190 |
| 9,109,454 B2 * | 8/2015 | Ellis | F01D 5/187 | |
| 9,249,674 B2 * | 2/2016 | Ellis | F01D 5/187 | |
| 9,334,745 B2 * | 5/2016 | Miyoshi | F01D 9/041 | |
| 2002/0076324 A1 | 6/2002 | Abuaf et al. | | |
| 2003/0143079 A1 * | 7/2003 | Kawarada | F01D 5/141 | 416/243 |
| 2004/0109764 A1 * | 6/2004 | Tiemann | F01D 11/006 | 416/97 R |
| 2005/0175463 A1 * | 8/2005 | Giot | F01D 5/22 | 416/224 |
| 2006/0056970 A1 * | 3/2006 | Jacala | F01D 5/08 | 416/97 R |
| 2006/0275126 A1 * | 12/2006 | Heitland | F01D 5/143 | 416/193 A |
| 2009/0010762 A1 * | 1/2009 | Caucheteux | F01D 5/22 | 416/189 |
| 2011/0236206 A1 * | 9/2011 | Seely | F01D 5/082 | 416/1 |
| 2013/0011265 A1 * | 1/2013 | Miller | F01D 11/008 | 416/191 |
| 2013/0108450 A1 * | 5/2013 | Ingram | F01D 5/143 | 416/223 A |
| 2014/0348661 A1 * | 11/2014 | Mahle | F01D 5/141 | 416/243 |
| 2016/0040534 A1 * | 2/2016 | Gautschi | F01D 5/3007 | 416/1 |

OTHER PUBLICATIONS

European Partial Search Report for European Patent Application No. 16155758 completed Jul. 5, 2016.

* cited by examiner

ARTICLE HAVING COOLING PASSAGE WITH UNDULATING PROFILE

STATEMENT REGARDING FEDERALLY SPONSORED RESEARCH OR DEVELOPMENT

This invention was made with government support under contract number N68335-13-C-0005 awarded by the United States Navy. The government has certain rights in the invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An article for a gas turbine engine according to an example of the present disclosure includes a body having a gaspath side for exposure in a core gaspath of a gas turbine engine. The gaspath side has an undulating surface. There is a cooling passage in the body. The cooling passage has an undulating profile that corresponds to the undulating surface.

In a further embodiment of any of the foregoing embodiments, the undulating surface has body peaks and valleys, and the undulating profile has passage peaks and valleys that correspond to the body peaks and valleys.

In a further embodiment of any of the foregoing embodiments, the passage peaks and valleys have a one-for-one correspondence to the body peaks and valleys.

In a further embodiment of any of the foregoing embodiments, the undulating surface has body peaks and valleys, and the undulating profile has passage peaks and valleys that substantially align with the body peaks and valleys.

In a further embodiment of any of the foregoing embodiments, the undulating surface has body peaks and valleys, and the undulating profile has passage peaks and valleys that substantially align with the body peaks and valleys such that a wall defined between the cooling passage and the undulating surface has a substantially constant thickness.

In a further embodiment of any of the foregoing embodiments, the undulating surface has body peaks and valleys, and the undulating profile has passage peaks and valleys that align with the body peaks and valleys such that a wall defined between the cooling passage and the undulating surface has a thickness within +/−0.030 inches (762 micrometers).

In a further embodiment of any of the foregoing embodiments, the undulating surface has body peaks and valleys, and the undulating profile has passage peaks and valleys that align with the body peaks and valleys such that a wall defined between the cooling passage and the undulating surface has a constant thickness.

In a further embodiment of any of the foregoing embodiments, the undulating profile corresponds to the undulating surface such that a first wall between the cooling passage and the undulating surface has a substantially constant thickness, and a second wall between the cooling passage and an opposed side of the body has a varying thickness.

In a further embodiment of any of the foregoing embodiments, the undulating surface is three-dimensionally undulating.

In a further embodiment of any of the foregoing embodiments, the body is a platform of an airfoil.

In a further embodiment of any of the foregoing embodiments, the undulating surface has at least one body peak or valley, and the undulating profile has at least one passage peak or valleys that corresponds to the at least one body peak or valley.

An article for a gas turbine engine according to an example of the present disclosure includes a body having forward and trailing ends, first and second mateface sides, and gaspath and non-gaspath sides. The gaspath side has an undulating surface and there is a cooling passage in the body. The cooling passage conforms to the undulating surface.

In a further embodiment of any of the foregoing embodiments, the cooling passage conforms to the undulating surface such that for a given thermal profile at the undulating surface there is a uniform temperature profile variation through a wall defined between the cooling passage and the undulating surface.

In a further embodiment of any of the foregoing embodiments, the cooling passage conforms to the undulating surface such that a wall defined between the cooling passage and the undulating surface has a constant thickness.

In a further embodiment of any of the foregoing embodiments, the cooling passage conforms to the undulating surface such that a wall defined between the cooling passage and the undulating surface has a substantially constant thickness within +/−0.030 inches (762 micrometers).

In a further embodiment of any of the foregoing embodiments, the undulating surface is three-dimensionally undulating.

In a further embodiment of any of the foregoing embodiments, the body is a platform of an airfoil.

A casting core according to an example of the present disclosure includes a core body for forming a cooling passage in a gas turbine engine article. The core body has an undulating profile that corresponds to an undulating surface on a gaspath side of the article.

In a further embodiment of any of the foregoing embodiments, the undulating profile is three-dimensionally undulating.

In a further embodiment of any of the foregoing embodiments, the undulating profile has peaks and valleys that correspond in a one-for-one correspondence to peaks and valleys of the undulating surface.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
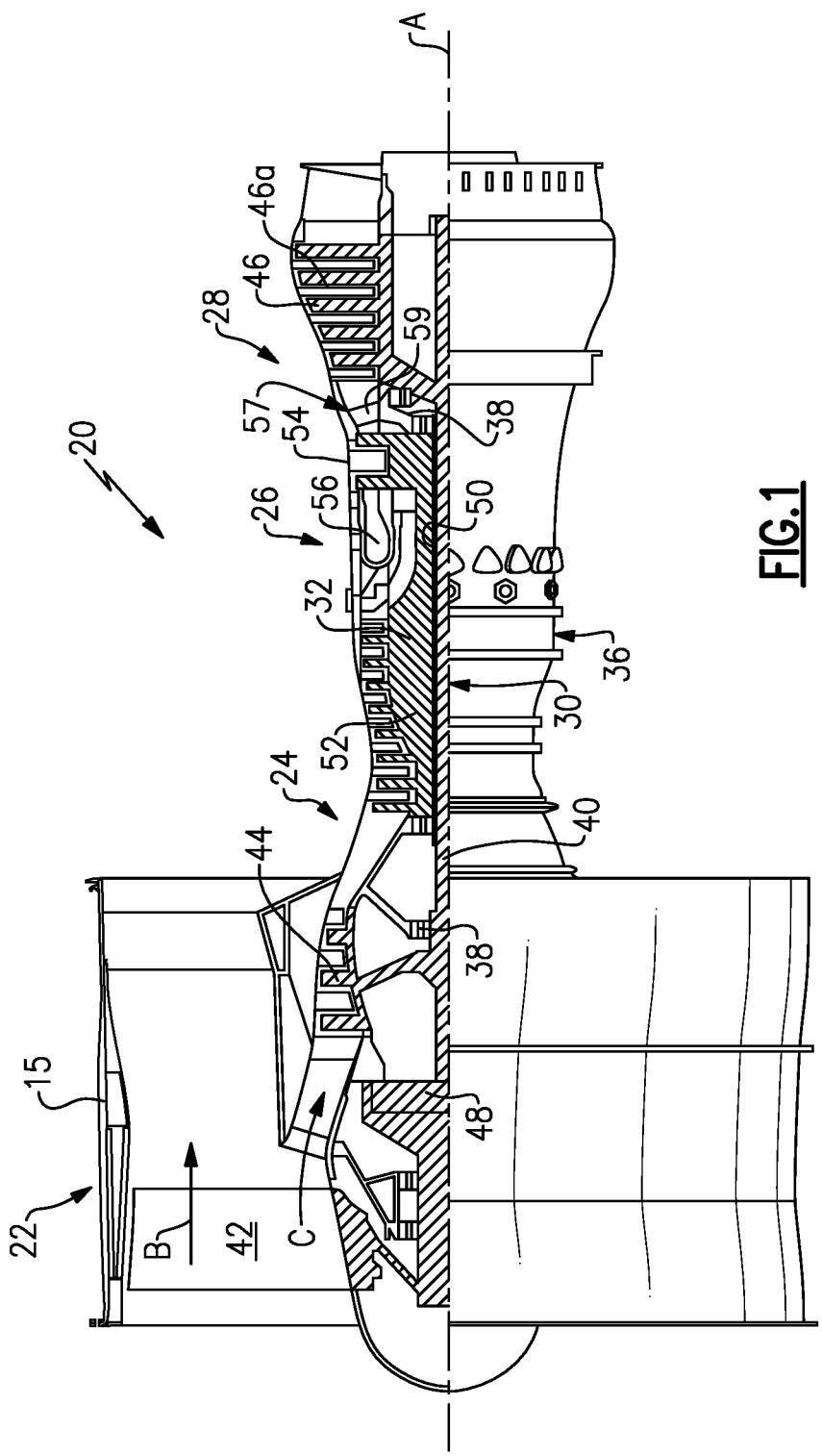
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
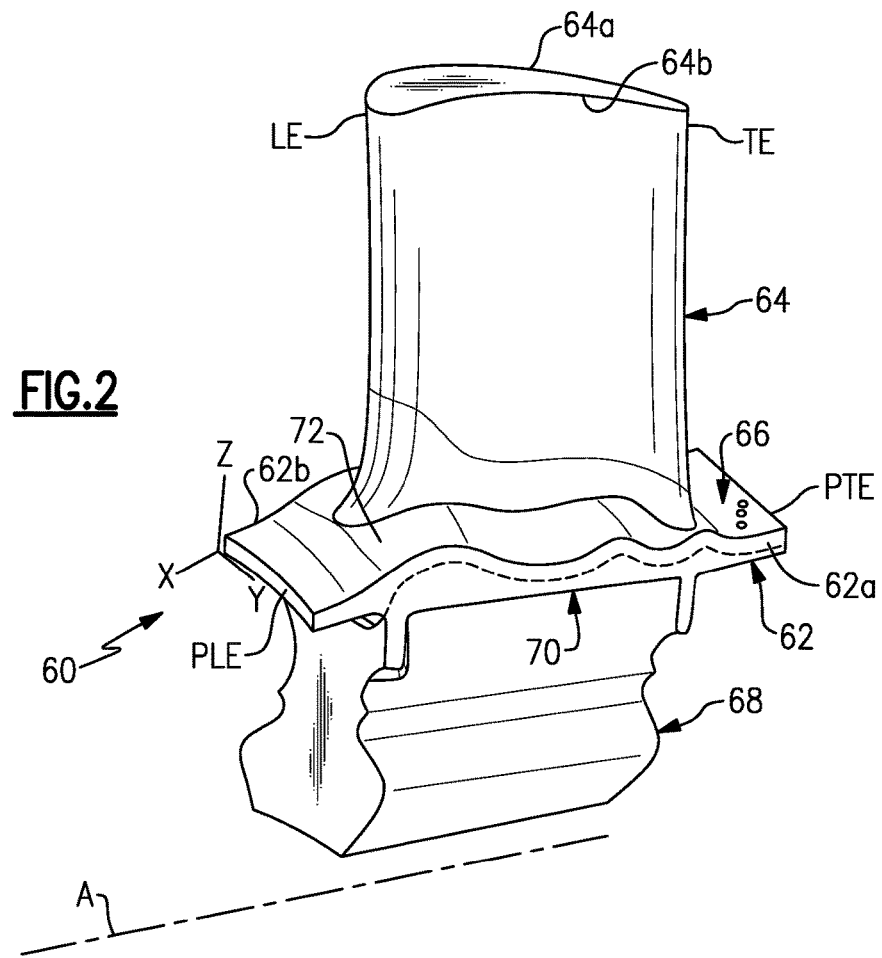
FIG. 2 illustrates an example article for use in the gas turbine engine.

FIG. 2 illustrates an example article 60 for use in the gas turbine engine 20. The article 60 is located in the core gaspath C and can be, but is not limited to, a blade, a vane, or a blade outer air seal. Thus, although the article 60 is described herein with respect to a turbine airfoil, shown in FIG. 2, this disclosure is applicable to other cooled articles of the gas turbine engine 20.

The illustrated airfoil includes a platform 62 and an airfoil portion 64 that extends radially outwardly from a gaspath side 66 of the platform 62. In this example, the airfoil is a turbine blade and also includes a root 68 that extends radially inwardly from a non-gaspath side 70 of the platform 62. Generally, the airfoil portion 64 has leading and trailing ends (LE and TE) and suction and pressure sides 64a/64b. The platform 62 has platform leading and trailing ends (PLE and PTE) and circumferential mateface sides 62a/62b. The region bound by the PLE, PTE, suction side 64a, pressure side 64b, and mateface sides 62a/62b is the platform 62, also referred to as a body for purposes of this disclosure.

As indicated by the contour lines, the gaspath side 66 of the platform 62 includes an undulating surface 72. For example, the undulating surface 72 influences gas flow over the gaspath side 66 of the platform 62, to facilitate controlling turbine efficiency.

Figure 3:
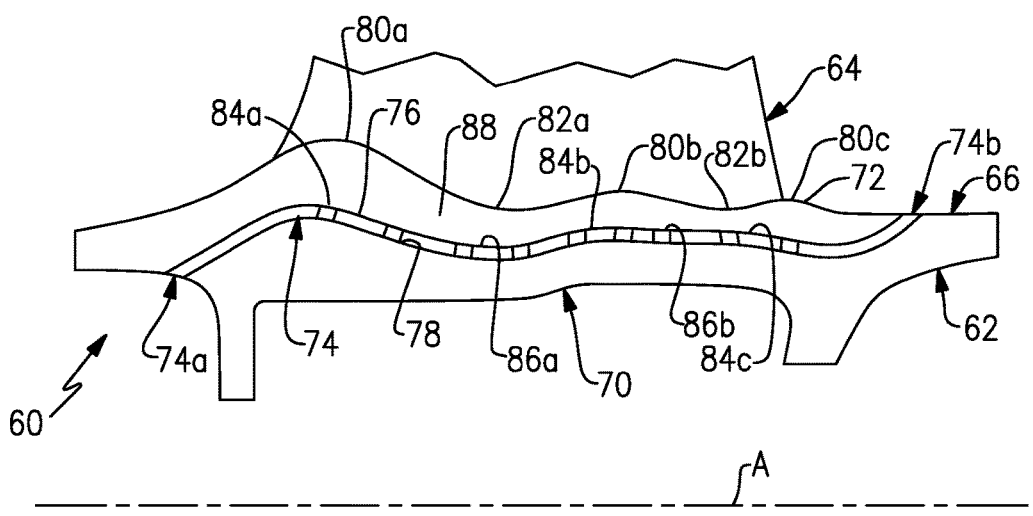
FIG. 3 illustrates an example article that has a cooling passage with an undulating profile.

FIG. 3 illustrates selected portions of an axial cross-section of the article 60 taken along a plane that intersects the engine central axis A. The platform 62 includes a cooling passage 74. The cooling passage 74 has an undulating profile, represented at 76, that corresponds to the undulating surface 72 of the gaspath side 66. In one example, the undulating profile 76 is represented by the radially outer surface of the cooling passage 74, although the undulating profile 76 may also or alternatively be represented by a mid-line of the cooling passage 74 or the radially inner surface of the cooling passage 74.

In further examples, the undulating surface 72, and thus also the undulating profile 76, is three-dimensionally undulating. For example, as shown in FIG. 2, there are coordinate orthogonal directions X, Y, and Z. The X-direction coordinate is generally parallel to the engine central axis A, the Z-direction is radial with regard to the engine central axis A, and the Y-coordinate represents the lateral direction. Thus, three-dimensional undulation means that the undulation varies in each of these coordinate directions.

The cooling passage 74 is a relatively wide (Y-direction) and flat (Z-direction) passage that is in close proximity to the undulating surface 72 such that there is a thin wall (represented at 88) between the passage 74 and the surface. For example, the cooling passage 74 can be formed by investment casting using a "minicore," which is a correspondingly relatively wide and thin casting core. Optionally, the cooling passage 74 can include internal features, represented at 78, such as but not limited to pins, for increasing surface area for thermal transfer.

The cooling passage 74 includes an inlet 74a and an outlet 74b. Cooling air from the compressor section 24 of the engine 20 generally flows from the inlet 74a to the outlet 74b. Here, the inlet 74a is located toward the platform leading end and the outlet 74b is located toward the platform trailing end and exits on the gaspath side 66. However, the cooling passage 74 can alternatively have an inlet 74a and outlet 74b that are located elsewhere on the platform 62 and that exit at the gaspath side 66, non-gaspath side 70, and/or mateface sides 62a/62b. Moreover, the cooling passage 74 can extend lateral of both the pressure and suction sides of the airfoil portion 64, only lateral of the pressure side, only lateral of the suction side, only forward of the leading end of the airfoil portion 64, or only aft of the trailing end of the airfoil portion 64.

As shown, the undulating surface 72 of the gaspath side 66 of the platform 62 has peaks, generally designated at 80a, 80b, and 80c, and valleys between the peaks, generally designated at 82a and 82b. The cooling passage 74 also has peaks and valleys. The peaks of the cooling passage 74 are generally designated at 84a, 84b, and 84c, and the valleys of the cooling passage 74 are generally designated at 86a and 86b. The peaks and valleys of the undulating profile 76 of the cooling passage 74 correspond to the peaks and valleys of the undulating surface 72 of the platform 62.

Hot gases flowing over the undulating surface 72 of the platform 62 heat the wall 88 between the cooling passage 74 and the undulating surface 72. The correspondence between the undulating profile 76 of the cooling passage 74 and the undulating surface 72 of the platform 62 facilitates providing a uniform temperature profile variation through the wall 88. For example, for a given thermal profile at the undulating surface 72, there is a uniform temperature profile variation through the wall 88, within about +/−50° C. The thermal profile can be based on a particular flight condition, such as cruise, take-off, or climb.

In one further example, the peaks 84a/84b/84c and valleys 86a/86b of the undulating profile 76 of the cooling passage 74 have a one-for-one correspondence to the peaks 80a/80b/80c and valleys 82a/82b of the undulating surface 72. That is, over the entire platform 62, the undulating profile 76 has the same number of peaks as the undulating surface 72 and the same number of valleys as the undulating surface 72.

Figure 4:
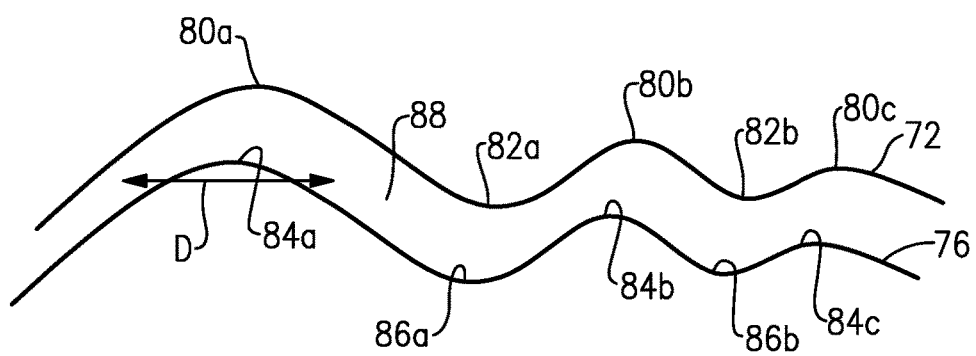
FIG. 4 illustrates representations of an undulating surface and an undulating cooling passage profile.

In an additional example, the peaks 84a/84b/84c and valleys 86a/86b of the undulating profile 76 of the cooling passage 74 substantially radially, axially, and laterally align with the peaks 80a/80b/80c and valleys 82a/82b of the undulating surface 72. The alignment can be such that the wall 88 has a substantially constant thickness. For example, the wall 88 has a constant thickness within at least +/−0.030 inches (762 micrometers). Thus, as depicted in FIG. 4 there may be insubstantial misalignment, for example in the direction D, between the apexes of corresponding peaks and corresponding valleys. However, the misalignment is minimal such that the wall 88 has the constant thickness to maintain the relatively uniform temperature profile variation.

Figure 5:
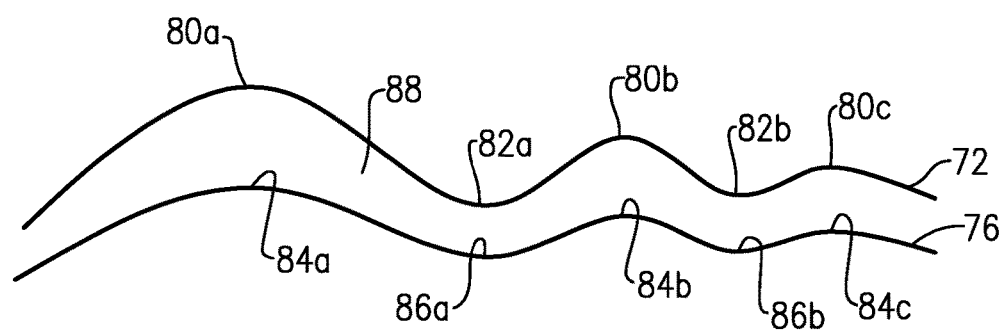
FIG. 5 illustrates representations of another undulating surface and undulating cooling passage profile.

As shown in the example in FIG. 5, there can additionally or alternatively be a difference in the magnitudes of the corresponding peaks and the corresponding valleys. However, the difference in the magnitudes is minimal such that the wall 88 can maintain the relatively uniform temperature profile.

In further examples, the cooling passage 74, namely the undulating profile 76, conforms to the undulating surface 72. For instance, there may or may not be a one-for-one correspondence between the numbers of peaks and valleys of the undulating profile 76 and the undulating surface 72. However, the undulating profile 76 conforms such that the wall 88 has a constant thickness within at least +/−0.030 inches (762 micrometers). In one further example, the conformance is such that the constant thickness is within at least +/−0.015 inches (381 micrometers).

Figure 6A:
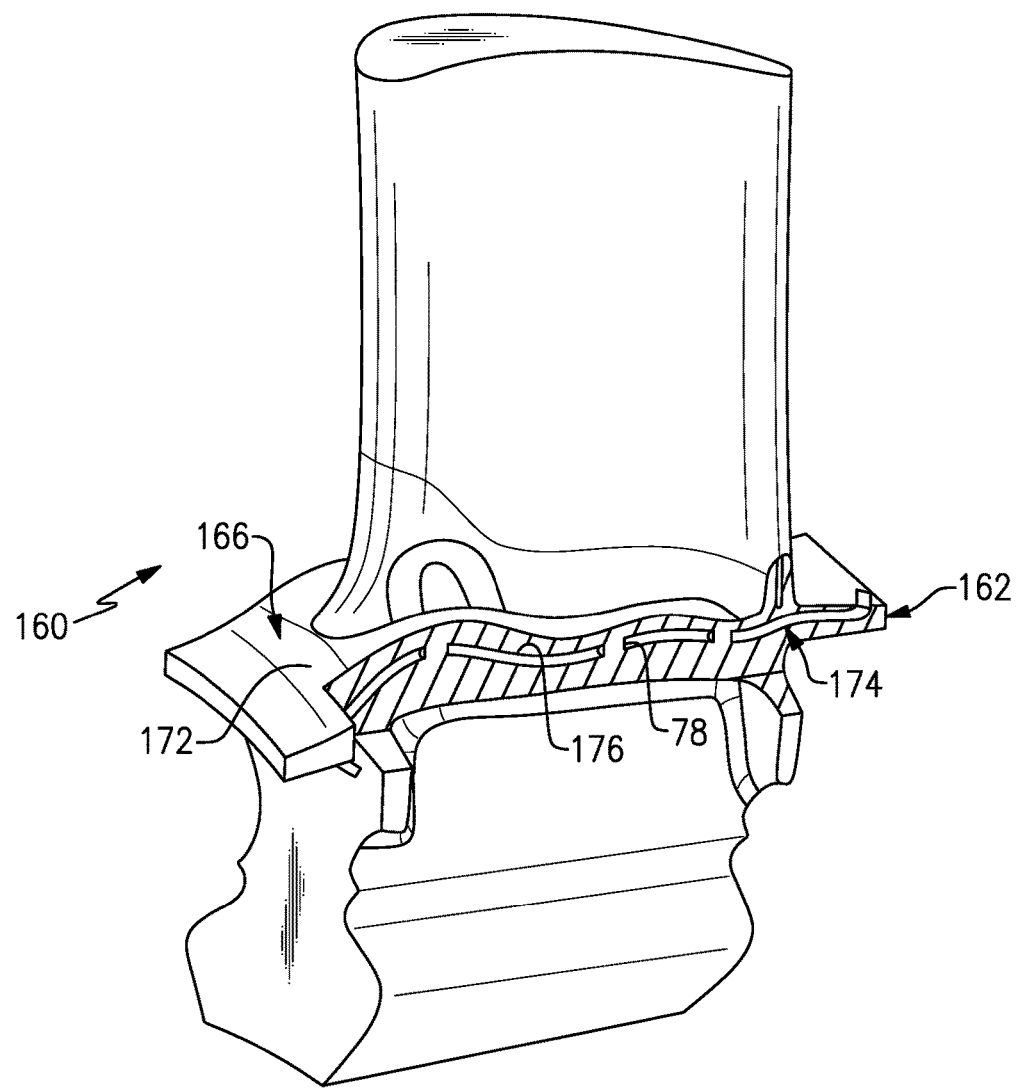
FIG. 6A illustrates another example article that has a cooling passage with an undulating profile.
Figure 6B:
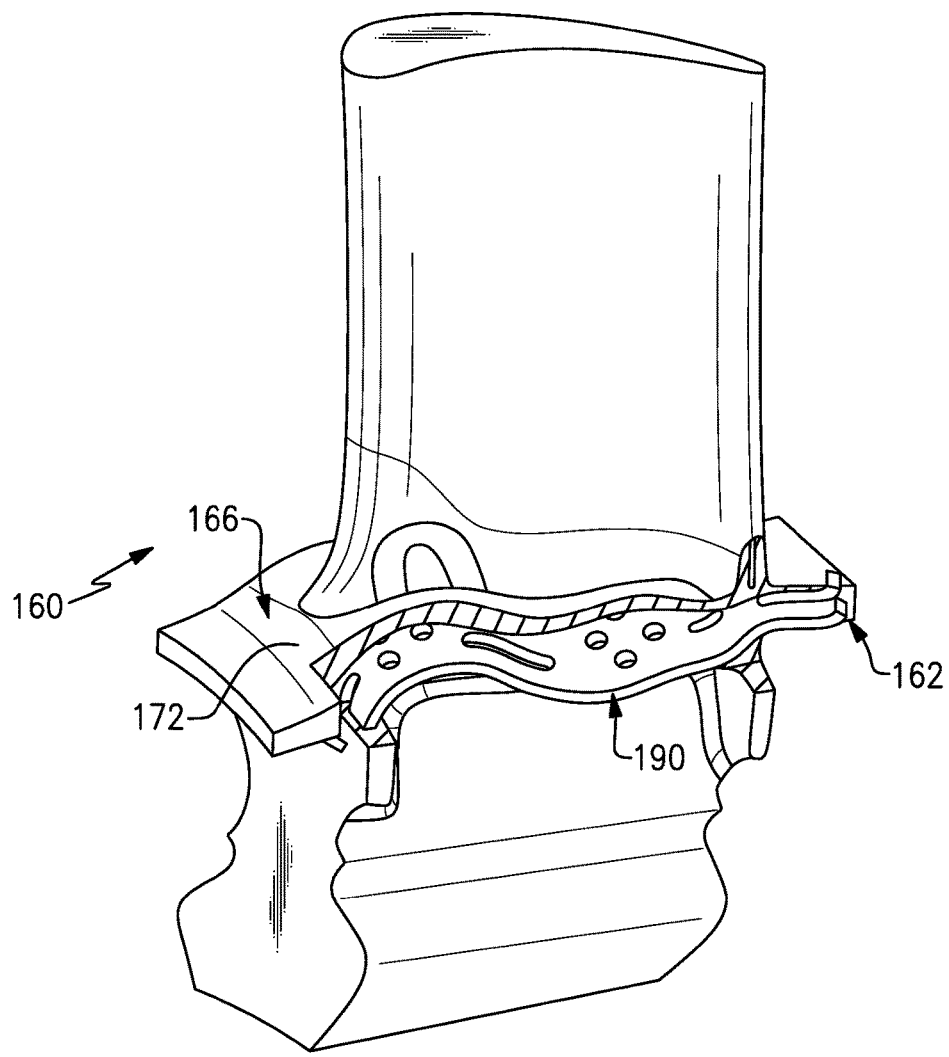
FIG. 6B illustrates the article of FIG. 6A with a casting core.
Figure 6C:
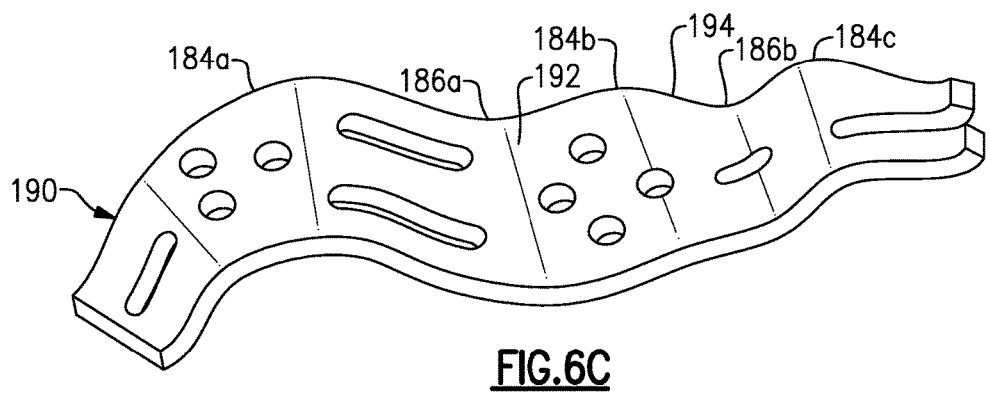
FIG. 6C illustrates an isolated view of the casting core of FIG. 6B.

The article 60 can be fabricated by investment casting. In investment casting, a ceramic or refractory metal core (and/ or "minicore") is arranged in a mold and coated with a wax material, which provides a desired shape of the article. The wax material is then coated with a ceramic slurry that is hardened into a shell. The wax is melted out of the shell and molten metal is poured into the remaining cavity. The metal solidifies to form the geometry of the article. The core is then removed, leaving internal passages within the article. In this regard, FIG. 6A illustrates another example article 160 with a portion of the platform 162 cutaway to reveal cooling passage 174 having an undulating profile 176. In this disclosure, like reference numerals designate like elements where appropriate and reference numerals with the addition of one-hundred or multiples thereof designate modified elements that are understood to incorporate the same features and benefits of the corresponding elements. FIG. 6B shows the article 160 with an example investment casting core 190 for forming the above-described cooling passage 174 in the article 160, and FIG. 6C shows an isolated view of the core 190. In this example, the core 190 includes a body 192 for forming the cooling passage 174. The body has an undulating profile 194, which corresponds to the undulating surface 172 of the gaspath side 166 of the platform 162. Similar to as described above, the undulating profile 194 of the core 190 can be three-dimensionally undulating. Likewise, the undulating profile 194 of the core 190 has peaks 184a, 184b, and 184c and valleys 186a, 186b that correspond to the peaks and valleys of the undulating surface 172, as also described above. Thus, the features described above with regard to the cooling passage 74 also represent examples of the core 190.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article for a gas turbine engine, comprising:
a cast body defining a gaspath side for exposure in a core gaspath of a gas turbine engine, a non-gaspath side, leading and trailing ends, and first and second mateface sides, the gaspath side having an undulating surface defining body peaks and valleys; and
a cooling passage in the cast body between the gaspath side and the non-gaspath side, the cooling passage having an undulating profile that corresponds to the undulating surface, wherein the undulating profile is defined by a radially outer surface of the cooling passage and a radially inner surface of the cooling passage such that the radially outer surface and the radially inner surface have passage peaks and valleys that align in a one-for-one correspondence with the body peaks and valleys.

2. The article as recited in claim 1, wherein the undulating surface has body peaks and valleys, and the undulating profile has passage peaks and valleys that substantially align with the body peaks and valleys such that a wall defined between the cooling passage and the undulating surface has a substantially constant thickness.

3. The article as recited in claim 1, wherein the undulating surface has body peaks and valleys, and the undulating profile has passage peaks and valleys that align with the body peaks and valleys such that a wall defined between the cooling passage and the undulating surface has a thickness within +/−0.030 inches (762 micrometers).

4. The article as recited in claim 1, wherein the undulating surface has body peaks and valleys, and the undulating profile has passage peaks and valleys that align with the body peaks and valleys such that a wall defined between the cooling passage and the undulating surface has a constant thickness.

5. The article as recited in claim 1, wherein the undulating profile corresponds to the undulating surface such that a first wall between the cooling passage and the undulating surface has a substantially constant thickness, and a second wall between the cooling passage and an opposed side of the body has a varying thickness.

6. The article as recited in claim 1, wherein the undulating surface is three-dimensionally undulating.

7. The article as recited in claim 1, wherein the body is a platform of an airfoil.

8. The article as recited in claim 1, wherein the undulating surface has at least one body peak or valley, and the undulating profile has at least one passage peak or valley that corresponds to the at least one body peak or valley.

9. An article for a gas turbine engine, comprising:
a unitary body having forward and trailing ends, first and second mateface sides, and gaspath and non-gaspath sides, the gaspath side having an undulating surface defining body peaks and valleys; and
a cooling passage in the unitary body between the gaspath and non-gaspath sides, the cooling passage conforming to the undulating surface, wherein the undulating profile is defined by a radially outer surface of the cooling passage and a radially inner surface of the cooling passage such that the radially outer surface and the radially inner surface have passage peaks and valleys that align in a one-for-one correspondence with the body peaks and valleys.

10. The article as recited in claim 9, wherein the cooling passage conforms to the undulating surface such that for a given thermal profile at the undulating surface there is a uniform temperature profile variation through a wall defined between the cooling passage and the undulating surface.

11. The article as recited in claim 9, wherein the cooling passage conforms to the undulating surface such that a wall defined between the cooling passage and the undulating surface has a constant thickness.

12. The article as recited in claim 9, wherein the cooling passage conforms to the undulating surface such that a wall defined between the cooling passage and the undulating surface has a substantially constant thickness within +/−0.030 inches (762 micrometers).

13. The article as recited in claim 9, wherein the undulating surface is three-dimensionally undulating.

14. The article as recited in claim 9, wherein the body is a platform of an airfoil.

15. A casting core comprising:
a core body for forming a cooling passage in a gas turbine engine article, the core body having an undulating profile that conforms to an undulating surface on a gaspath side of the article wherein the undulating profile is defined by a radially outer surface of the core body and a radially inner surface of the core body such that the radially outer surface and the radially inner surface have core body peaks and valleys that align in a one-for-one correspondence with peaks and valleys of the undulating surface on a gaspath side of the article.

16. The casting core as recited in claim 15, wherein the undulating profile is three-dimensionally undulating.

17. The article as recited in claim 1, wherein the non-gaspath side is non-conforming with the gaspath side.

18. The article as recited in claim 1, wherein the cooling passage has an inlet located towards the leading end and an outlet located toward the trailing end.

19. The article as recited in claim 1, wherein the cooling passage includes a plurality of internal features that increase surface area in the cooling passage for thermal transfer.

20. The article as recited in claim 9, wherein the non-gaspath side is non-conforming with the gaspath side.

21. The article as recited in claim 9, wherein the cooling passage has an inlet located towards the leading end and an outlet located toward the trailing end.

22. The article as recited in claim 9, wherein the cooling passage includes a plurality of internal features that increase surface area in the cooling passage for thermal transfer.

23. The article as recited in claim 1, wherein the cooling passage is of constant thickness.

24. The article as recited in claim 9, wherein the cooling passage is of constant thickness.

\* \* \* \* \*